May 12, 1959 J. J. KUPCHICK 2,886,347
SEALS FOR ROTATABLE MEMBERS
Filed Oct. 29, 1956
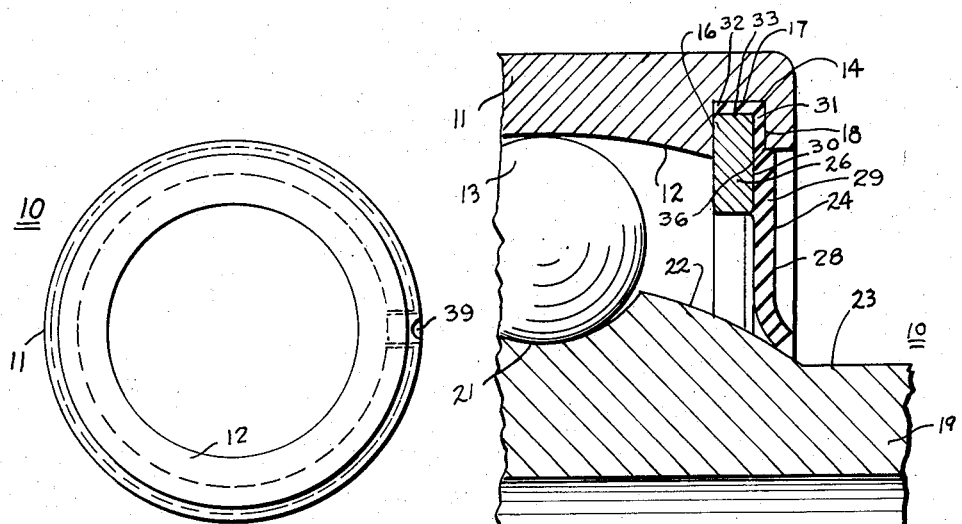
Fig. 1
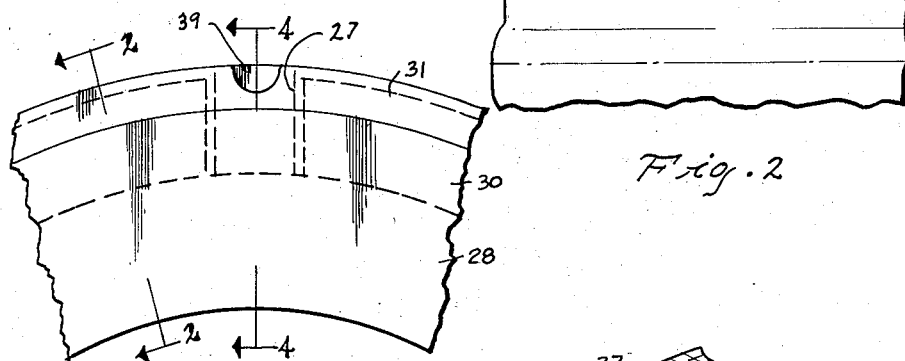
Fig. 2
Fig. 3
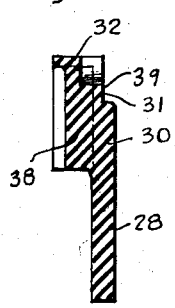
Fig. 4
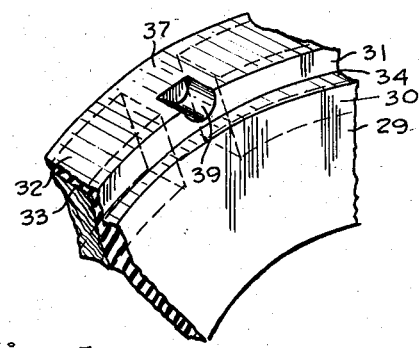
Fig. 5
INVENTOR.
John J. Kupchick
BY
Richmond S. Hayes
ATTORNEY 2,886,347

SEALS FOR ROTATABLE MEMBERS

John J. Kupchick, Bristol, Conn., assignor to Marlin-Rockwell Corporation, Jamestown, N.Y., a corporation of New York Application October 29, 1956, Serial No. 618,882

3 Claims. (Cl. 286—5)

This invention relates to an improvement in seals for bearings or other devices having relatively rotatable concentric members wherein it is desired to contain a lubricant and exclude the entry of dirt or other foreign matter.

Generally, the invention has been developed for the purpose of providing a seal that may be easily manufactured at very low cost. Also, the design of the seal and relative proportions of the metal and resilient parts thereof are such that the seal is not subject to permanent distortion either in handling or in assembling with a bearing ring or other rotatable member.

More particularly, the invention is applicable to bearings or other relatively rotatable members of the type intended to be self-aligning. Herein the relatively rotatable members, within predetermined limits, are capable of angular variation without becoming misaligned. The present seal not only serves to prevent the escape of the contained lubricant and the exclusion of exterior dirt or other matter, but does so regardless of the various angular stationary or running positions of the members. Furthermore, the seal serves as a positive stop or positioner by which to limit the relative angularity of the members to their operative capacity. In other words, the seal embodying the present invention serves a dual purpose and thus eliminates the need for additional parts or specially constructed portions on either of the members with which it is associated. Furthermore, the resilient material and split metal ring embodying the seal are so formed and joined that repeated installation, removal, or handling of the seal can in nowise cut, tear, or otherwise impair it.

Other advantages and objects of the invention will be more fully understood and appreciated from a consideration of the following specification, taken in conjunction with the accompanying drawings; in which Fig. 1 is a side elevational view of a seal embodying the invention;

Fig. 2 is a greatly enlarged fragmentary cross sectional view of the seal showing its relationship to a pair of relatively rotatable members, that portion of the seal shown being indicated by the line 2—2 of Fig. 3;

Fig. 3 is an enlarged fragmentary elevational view of the seal at the point of separation of the metal ring;

Fig. 4 is a transverse sectional view of the seal, taken substantially on the line 4—4 of Fig. 3; and Fig. 5 is a fragmentary exploded view in section showing the seal prior to being inserted into the groove of one of the members.

Referring more particularly to the drawings, the reference numeral 10 is employed to generally designate a ball bearing or other structure embodying relatively rotatable concentric parts. In the present disclosure, the bearing includes an outer ring 11, the inner surface of which consists of a transversely curved race 12 with which balls 13 contact. The lateral edges of the ring 11 are formed with radially inwardly opening grooves 14. These grooves are preferably rectangular in cross section and include inner walls 16 that define the lateral edges of the curved race 12. Each groove is further defined by a base wall 17 and an outer wall or flange 18. It will be noted that the outer wall 18 is of less radial depth than the inner wall 16.

The inner ring 19 includes a circumferential groove or raceway 21 for receiving the balls 13 and confining their movement to a given circumferential path about said inner ring. The edges of the raceway 21 are defined by an inclined surface 22 and this surface may terminate in a flat area 23 that is beyond the lateral limits of the outer ring 11. Since the invention is presently shown assembled with a self-aligning bearing, it will be understood that a measure of angular movement may obtain as between the outer and inner rings due to the curved race 12 and that the surface 22 of the inner ring provides for contact of a portion of a seal 24 therewith in any predetermined angular relationship of the rings.

The seal 24 consists of a split metal ring 26. This ring, in cross section, is of generally rectangular proportions. The adjacent ends 27 thereof are not only spaced apart to enable constriction and reduction in the diameter of the ring for purposes of installation or removal, but are preferably parallel, the plane thereof being generally radial of the ring.

A disk-like ring 28, formed from elastomeric material constitutes the balance of the seal 24. This disk includes a cross sectional body of substantial portions that is bonded to the outer vertical surface 30 of the ring to an extent somewhat less than the ring's sectional height. From the upper edge of the body, the disk continues in a relatively thin portion 31 that is also bonded to the ring and encloses the remainder of the vertical surface 30. This portion continues over the circumferential edge 33 of the ring, as at 32, to provide resilient sealing engagement with the base 17 of the groove 14 when the seal is mounted in the outer ring 11 of the bearing 10. The difference in thickness between the body portion 29 and the thinner portion 31 creates an annular shoulder 34 and this shoulder is intended to engage the radial edge 36 of the flange 18.

The disk 28, of course, is an unbroken ring and is bonded to the split ring when the ends 27 of said ring are in the spaced relationship suggested in Fig. 3. Obviously, the disk must bridge the space between the split ring ends 27 and this bridging portion includes an integral inwardly projecting web 38 which substantially doubles the transverse thickness of the disk at this point. This web extends radially outwardly and is integral with the circumferential portion 32 above described. A semicircular recess 39 is made in the web 38 and portion 32, substantially as shown in Figs. 3 and 4. This recess enables convenient and easy constriction of the split ring during assembly of the seal with the bearing without such distortion of the bridging part 37 as would tend to cut, tear, or otherwise damage this area of the disk.

To install a seal of the type of the invention, it is merely necessary to apply radial pressure to portions of the seal remote from the recess 39. This compresses the web portion of the disk 28 and decreases the diameter of the seal as the ring ends 27 are brought into close proximity. The seal is then placed into the bearing with the inner face of the ring 26 in contact with the inner wall 16 of the groove 14. Normal springiness of the ring 26 will cause the seal to radially expand and force the portion 32 of the disk into contact with the base 17 of the groove. Simultaneously, the relatively thin portion 31 of the disk is compressed and, thus, the ring 26 firmly abuts the inner wall 16 of the groove. As has been stated, the ring 26 is of sufficient cross sectional height to extend inwardly beyond the wall 16 and, as may be seen in Fig. 2, serves as a barrier or stop to any relative lateral movement to limit relative angularity of the bearing members, such limits, of course, defining the operative angular capacity of the bearing. In other words, the balls 13, although confined to a path of travel by the raceway 21, are capable of transverse movement with respect to the outer ring 11 over the curved race 12 to the extent defined by the rings 26.

Although applicant has shown and described only one form of the invention and its mounting in a given type of relatively rotatable concentric members, it is contemplated that variations in the structure may be made without departing from the spirit and scope of the invention insofar as such variations are defined by the annexed claims.

Having thus set forth my invention, what I claim as new and for which I desire protection by Letters Patent is:

1. A seal adapted to span the space between a pair of relatively rotatable concentric members, one of said members having a marginally located annular recess radially facing the other of said members and including an inner wall of greater radial depth than the outer wall, said seal comprising a split metal ring, the ends of said ring being parallel and spaced apart, the plane of said ends being substantially radial, an elastomeric ring-like sealing disk bonded to one lateral face of said ring, and having a radially extending portion adapted to contact a surface on the other of said members, that part of said disk bridging the space between said ring ends including an offset web that lies within the lateral limits of said ring, said part including a relieving recess for purposes of assembly, a further portion of said disk overlying one radial edge of said ring, said seal being adapted to engage said one member with said ring in abutment with said inner recess wall and said further disk portion in contact with the base wall of said recess.

2. A seal adapted to span the space between the relatively rotatable rings of a bearing wherein one of the rings has a marginally located annular recess radially facing the other of said rings, with the inner wall of said recess defining one marginal edge of a rolling raceway, said seal comprising a split metal ring, the ends of said ring being spaced apart and parallel, the plane of said ends being generally radial, an elastomeric ring-like sealing disk bonded to the outer and circumferential surfaces of said ring and having a radial portion extending beyond said ring for contact with the other of said bearing rings, that portion of said disk that bridges the space between said ring ends including an offset that is within the lateral limits of said metal ring and having a recess to provide compression relief when said metal ring is contracted during installation or removal of said seal, said metal ring, when said seal is mounted being adapted to abut the inner wall of said recess and extend radially therebeyond to form a lateral edge to said raceway.

3. A seal adapted to span the space between the relatively rotatable rings of a bearing wherein one of the rings has a marginally located annular recess radially facing the other of said rings with the inner wall of said recess defining one marginal edge of a rolling raceway, said seal comprising a split metal ring, the ends of said ring being spaced apart and parallel, the plane of said ends being generally radial, an elastomeric ring-like sealing disk bonded to the outer and circumferential surfaces of said ring and having a radial portion extending beyond said ring for contact with the other of said bearing rings, that portion of said disk that bridges the space between said ring ends including an offset that is within the lateral limits of said metal ring and having a recess to provide compression relief when said metal ring is contracted during installation or removal of said seal, said seal being adapted, when mounted in said recess, to locate said metal ring in abutment with the inner wall of said recess and with a portion thereof extending radially beyond the edge of said inner recess wall to form a lateral inward continuation to the edge of said raceway.

References Cited in the file of this patent

UNITED STATES PATENTS

| | | |
|---|---|---|
| 2,298,463 | Burt | Oct. 13, 1942 |
| 2,310,607 | Batesole | Feb. 9, 1943 |
| 2,587,405 | Stevens et al. | Feb. 26, 1952 |
| 2,757,052 | Spurgeon | July 31, 1956 |